United States Patent [19]

Gilman

[11] 3,887,692

[45] June 3, 1975

[54] MICROSPHERICAL BASIC ALUMINUM HALIDES AND METHOD OF MAKING SAME

[75] Inventor: William S. Gilman, South Plainfield, N.J.

[73] Assignee: Armour Pharmaceutical Company, Phoenix, Ariz.

[22] Filed: July 10, 1972

[21] Appl. No.: 269,991

[52] U.S. Cl. .................. 423/462; 204/94; 264/14; 423/495
[51] Int. Cl. ........ C01d 7/00; C01d 7/02; C01d 7/56
[58] Field of Search ............. 423/462, 495; 204/94; 264/14

[56] References Cited
UNITED STATES PATENTS

| | | | |
|---|---|---|---|
| 1,782,038 | 11/1930 | Haak | 264/14 |
| 2,492,085 | 12/1949 | Andersen | 423/462 X |
| 3,113,911 | 12/1963 | Jones | 204/94 |
| 3,230,035 | 1/1966 | Podschus et al. | 423/462 |
| 3,240,687 | 3/1966 | Konig et al. | 204/94 |
| 3,342,921 | 9/1967 | Brundige et al. | 264/12 X |
| 3,530,207 | 9/1970 | Scheer | 264/14 |

FOREIGN PATENTS OR APPLICATIONS 489,769   8/1938   United Kingdom ................ 423/495

OTHER PUBLICATIONS

Perry et al., "Chemical Engineers' Handbook," 4th Edition, 1963, pages 20-57 thru 20-61.

Primary Examiner—F. C. Edmundson
Attorney, Agent, or Firm—Frank T. Barber; Carl C. Batz

[57] ABSTRACT

Basic aluminum halides in particulate form wherein the particles are solid and spherical in shape having a diameter of from 2 to 500 microns. The disclosure further refers to aerosol antiperspirant compositions containing such halides along with a propellant. A process is disclosed for making such halides in microspherical form wherein an aqueous solution of the halide is discharged into the vortex of a whirling liquid, the liquid being an organic alcohol having from 4 to 5 carbon atoms and containing a branch chain methyl group. The halide, in microspherical form is separated from the alcohol and may be incorporated in an aerosol antiperspirant composition. This composition is free flowing, does not settle to make a firm cake and does not clog the aerosol equipment.

20 Claims, 4 Drawing Figures 3,887,692

MICROSPHERICAL BASIC ALUMINUM HALIDES AND METHOD OF MAKING SAME

This invention pertains to basic aluminum halides in microspherical form, and to aerosol antiperspirant compositions containing such halides in microspherical form. The invention further pertains to processes for the preparation of such halides in microspherical form.

BACKGROUND

The antiperspirant properties of aluminum chlorhydroxide are well known, and this substance has been used in powders, creams and lotions for the purpose of decreasing perspiration. More lately this substance has come into large scale usage as an aerosol spray. The aluminum chlorhydroxide is suspended in an oily substance and encased along with suitable propellants in an aerosol bomb. This type of syspension is referred to in the art as a powder-in-oil type of antiperspirant composition. Suspending agents are commonly added for the purpose of maintaining a homogeneous system and to help retard the solid aluminum chlorhydroxide particles from settling out to form a hard cake which is difficult to resuspend.

U.S. Pat. No. 3,088,874 and Canadian Pat. No. 897,589 disclose the use of suspending and/or bulking agents in aerosol antiperspirant formulations for preventing valve malfunctions and preventing compacting or caking of the antiperspirant powder. Such agents include hydrophobic treated clays and colloidal silicas.

Settling out of the aluminum chlorhydroxide continues to be a problem, and various other alternatives have been tried. For example, it has been suggested to put an electrical charge on the aluminum chlorhydroxide causing electrostatic repulsion of the particles. Shearing of the aluminum chlorhydroxide particles has been tried with some success, but the problem still persists.

There also has been difficulty in the clogging of the orifices and the dip tubes of the aerosol bombs which are used to dispense the antiperspirant compositions, this clogging being due to agglomeration at the very small openings through which the compositions must pass. This tendency to agglomeration has made it necessary to grind or mill the aluminum chlorhydroxide prior to its formulation as a suspension, but even with such prior treatment agglomeration has continued to be a problem.

SUMMARY

I have discovered processes which make it possible to prepare the basic aluminum halides in microspherical form and wherein the microspheres are solid and uniformly spheroidal in shape, and of a size which gives the substance unusual advantages in the antiperspirant field.

In the process of my invention the aluminum chlorhydroxide or other such basic aluminum halide is passed in aqueous solution through a nozzle or atomizer to produce a fine spray or mist, the spray being directed into the vortex of a whirling body of liquid, the liquid being an organic alcohol containing 4 to 5 carbon atoms and having a branched methyl group.

The microspherical basic aluminum halides so obtained are solid and as shown by photomicrographs are almost perfectly spheroidal in shape. They may be prepared in the size of from 2 to 500 microns which is found to be preferred for use in aerosol compositions and can be formed of substantially uniform size within this range. It has been understood in the art that in order to prepare high quality compositions the particles must be reduced in size, usually by milling or grinding, to an average of less than 44 microns as a cross dimension.

I have found that basic aluminum halides in microspherical form are free flowing, of a size range suitable for aerosol use without grinding or milling, are non-agglomerating, will not separate as a hard cake from other ingredients, and, when formulated into aerosol antiperspirant compositions, are easily resuspendable.

DRAWINGS

Certain embodiments of my invention are illustrated in the accompanying drawings, in which.

Figure 3:
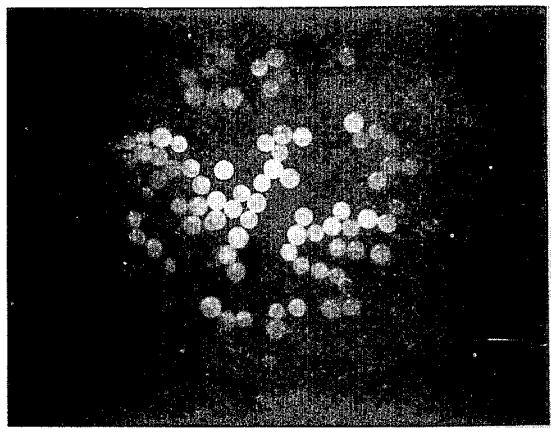
Figure 4:
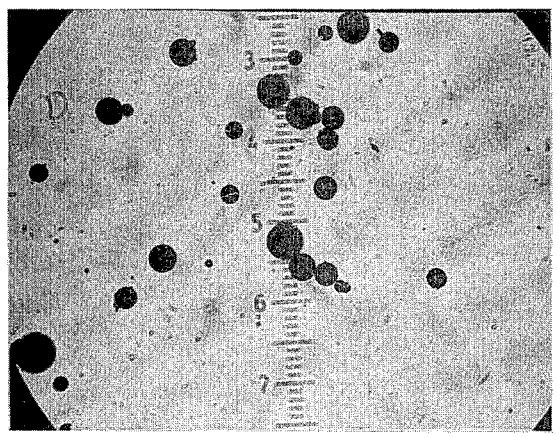

FIG. 3 is a photomicrograph showing microspherical aluminum chlorhydroxide at 100 times magnification, the size of the particles shown being approximately 200 microns in diameter, the photomicrograph being taken with incident light; and FIG. 4 is a photomicrograph showing microspherical aluminum chlorhydroxide at 100 times magnification, the size of the particles shown being in the range of from 50 to 500 microns in diameter, the photomicrograph being taken with transmitted light.

DETAILED DESCRIPTION

The basic aluminum halides to which my invention is addressed may be represented by the general formula $Al_n(OH)_xQ_y \cdot XH_2O$, where $n$, $x$ and $y$ may be integers but need not be, where $x+y=3n$, $x$ is at least 2, X is a quantity from 2 to 4 which need not be an integer, and Q is chlorine, bromine, or mixtures thereof. I prefer the 5/6 basic aluminum halides which have the formula $[Al_2(OH)_5Q]$, but the ⅔ basic halides $[Al(OH)_2Q]$ and the ¾ basic halides $[Al_4(OH)_9Q_3]$ are useful, and I can use mixtures of these, as well as mixtures of the chlorides and the bromides. For convenience I use brackets to enclose groups of chemical elements which are not necessarily all the elements of the molecular structure, and do not mean to exclude $H_2O$ groups.

Figure 1:
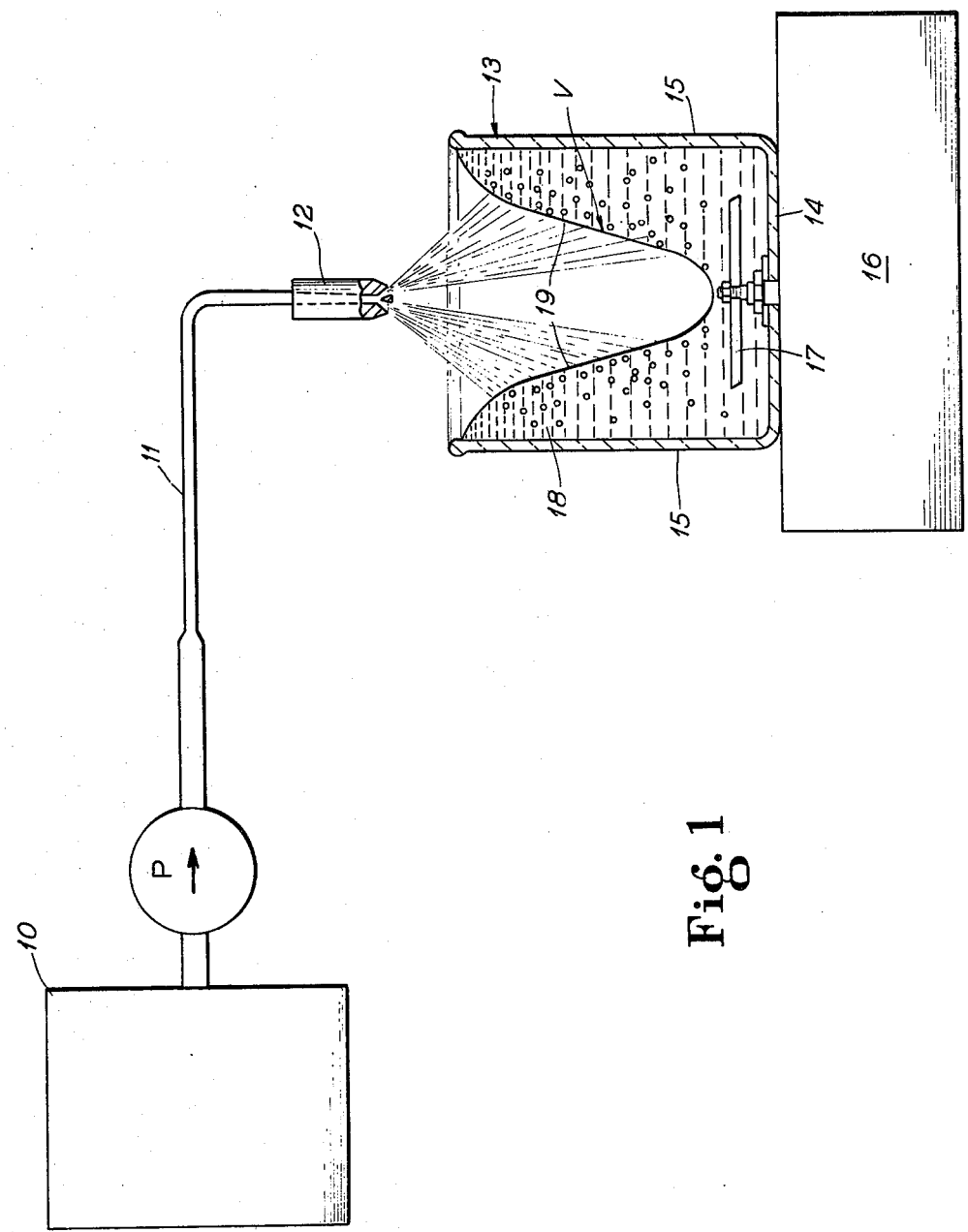
FIG. 1 is a schematic view, partly in section, of apparatus which may be utilized in the practice of my invention.

The practice of my process will be explained in connection with FIG. 1 of the drawing where a container 10 at the left-hand side of the figure contains an aqueous solution of the aluminum halides. The aqueous solution contains sufficient water or other diluent to enable it to be passed through the atomizing equipment. A 50 percent by weight aqueous solution of the aluminum halides has been found satisfactory, but if yet lower viscosity is desired the solution may be heated, or may be diluted with water or alcohol to, for example, 25 percent by weight aluminum halide in the solution. The aqueous solution contains at least the water in the basic aluminum halide, and as diluents I prefer to use additional water and/or ethyl alcohol, but may also use methyl or propyl alcohol.

The aqueous basic aluminum halide solution from the container 10 is pumped by pump P through line 11 to the nozzle 12 from which the solution is discharged in the form of very fine droplets which might be called a mist, against the sides of a vortex V which is formed by whirling liquid within the container 13.

The container 13 has a flat base 14 and cylindrical walls 15, and rests on the base 16. A magnetic or mechanical impeller 17 is arranged in the bottom of the container and is rotated so as to drive the liquid 18 in a circular whirling motion thus to produce the vortex V in the center of the liquid body.

Liquid 18 is an organic alcohol containing 4 to 5 carbon atoms and having a branched chain methyl group. Such alcohols include 2-methyl-1-propanol (isobutyl alcohol), secondary butyl alcohol, 2-pentanol, isopentanol, 2-methyl-1-butanol, and 2-methyl-2-butanol.

The fine droplets of the basic aluminum halide solution issuing from nozzle 12 strike the sides 19 of the vortex V and, apparently through contact with the rapidly moving liquid surface, are caused to assume spheroidal form as they are received into the liquid. It may be observed that the sides 19 are downwardly inclined toward the center of the container and this condition is also believed to contribute to the formation of the sheres.

It is possible instead of using a spray nozzle, such as the nozzle 12 illustrated, to use a hollow tube or needle and to discharge a fine stream against the side of the vortex formation. For example, I may use a hypodermic needle and so discharge a very fine stream of the aqueous basic aluminum halide into the side of the vortex, and this is effective to produce the basic aluminum halide microspheres. In this specification and claims I use the expression "in finely divided form" to describe the introduction of the basic aluminum halides to the vortex whether this be by a very fine spray through a nozzle or a very fine stream as from a hypodermic needle.

The liquid 18 should be whirled at a rapid rate of speed so as to form the vortex and maintain the vortex as the halides are being introduced. Since the interior of the container 13 is cylindrical in shape, the liquid may easily be whirled by use of the impeller 17, or other such device, to come into the cross sectional shape illustrated in FIG. 1. Once the very fine droplets assume spherical form and pass wholly into the liquid, they hold this shape while submerged and as they lose moisture within the liquid.

Contact of the aqueous spheres with the alcohol in container 13 results in absorbtion of water from the spheres into the alcohol, and the water content of the spheres drops while the spheres solidify themselves, until their moisture content is desirably below 35 percent by weight, and may be as low as about 15 percent by weight of the microspherical basic aluminum halide product. The solidified microspheres may be separated from the alcohol solution by filtering or decantation and then may be utilized in the preparation of antiperspirant compositions.

The sizes of the spheres may be controlled by controlling the fineness of the droplets which are discharged from nozzle 12 into the vortex V, with extremely fine particles forming the smaller spheres and the particles not so fine forming spheres of relatively larger size. I have found that with nozzles which are now readily available it is practicable to control the size of the droplets quite closely to produce selected sizes of microspheres within the range of from 2 to 500 microns in diameter. Preferably, I control the size to produce spheres of 200 microns or less, with the best product being obtained when the size of the droplets is controlled to produce microspheres having an average size which is below 44 microns in diameter.

The organic alcohol liquid 18 is suitable for use as a drying agent until it comes to have a moisture content of about 10 percent by weight, and when the moisture reaches about this amount a fresh batch of alcohol is used, or the alcohol may be distilled for reuse.

The extent of drying of the microspheres may be controlled by increasing or decreasing the rate of agitation of the liquid and by the length of time the microspheres remain in contact with the alcohol. It is practical to filter the alcohol and recover the microspheres following the spraying of the droplets into the vortex, but by continuing the agitation of the liquid containing the microspheres for a further period of several minutes a yet drier product can be obtained.

The basic aluminum halides in microspherical form which are obtained by the process above described are sold and almost perfectly spherical in shape. They are dry, free flowing and substantially 100 percent of the particles are in spherical form. They may be small in size — small enough that when coated on the skin they feel smooth and free from grittiness, and there is no need for grinding or milling to obtain this effect. When formulated into antiperspirants suitable for use in aerosol form they do not agglomerate at the dip tube or nozzle orifice of the aerosol bomb. In addition, they do not settle to form a firm cake and are easily suspended with only slight agitation. In these improved aerosol formulations I can use suspending or bulking agents but it is not necessary to use these agents as has been taught in the prior art. The character of these halides is illustrated by photomicrographs in FIGS. 2 to 4 of the drawings. The spheroidal form of the particles is perhaps best shown in FIG. 2 wherein incident light is used and the particles are seen as shaded and appear as spheres. FIG. 3 illustrates the formation of microspheres of basic aluminum halides where the size is controlled quite closely to a uniform diameter. FIG. 4 shows the basic aluminum halide particles as seen by transmitted light. Under transmitted light the microspheres appear in outline as circular black dots.

Basic aluminum halide compounds in microspherical form of 2 to 500 microns in diameter must be distinguished from any such substance in which the particles are of a size within the range obtained by shearing, milling, or grinding, or where the particles are of nonspheroidal shape as in the form of scales or shells, or which are hollow or only partial spheres. The particles of my compounds are solid and substantially all of them are fully spheroidal in shape, as shown especially by FIGS. 2 to 4 of the drawings.

The microspherical basic aluminum halides may be formulated with suitable propellants to form an improved aerosol composition. Preferably, an oily constituent is included in the composition in which my special aluminum halides are contained in suspension. Suitably this oily constituent may be isopropyl myristate, or such oily substance which also has emollient properties. suitably, the microspherical halide may be in an amount of from about 0.5 to 10.0 percent by weight of the composition; the oily ingredient in an amount of from 1.0 to 50.0 percent by weight of the composition;

and the propellant, which may be of the fluorinated or partially fluorinated type such as is sold, for example, under the tradenames Freon-11 and Freon-12, may be in the amount of from 25 to 98 percent by weight of the composition.

Special examples of the preparation of my basic aluminum halides in spherical form, and aerosol antiperspirant compositions containing them, are given as follows:

EXAMPLE I

Figure 2:
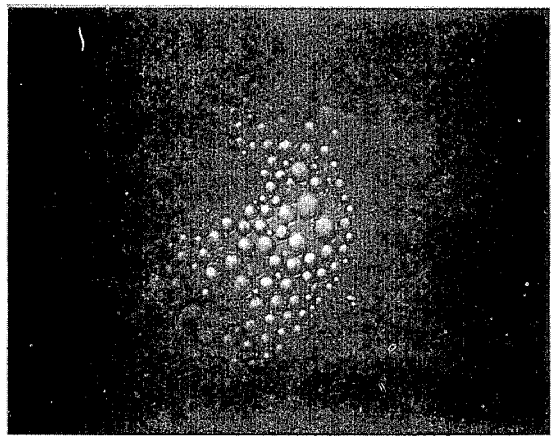
FIG. 2 is a photomicrograph showing microspherical aluminum chlorhydroxide at 100 times magnification, the size of the particles shown being 25 to 500 microns in diameter, the photomicrographs being taken with incident light.

A 500 ml aqueous solution of aluminum chlorhydroxide [$Al_2(OH)_5Cl$] assaying at approximately 12.5 percent aluminum and 8.15 percent chloride was mixed with an equal volume of denatured ethyl alcohol forming a homogeneous, water-clear, mixed solvent solution. This solution was introduced at a rate of 8 mls per minute through an 18 gauge hypodermic needle into the vortex of a mechanically agitated 800 ml volume solution of anhydrous 2-methyl-1-propanol (isobutyl alcohol). This addition required approximately one hour. Immediately following this addition the resulting microspherical aluminum chlorhydroxide product was recovered from the 2-methyl-1-propanol by filtration followed by air drying for one hour. The product recovered weighed 257 grams, was free from 2-methyl-1-propanol as determined by gas chromatographic analysis, and assayed at 22.5 percent aluminum, 15.3 percent chloride, and 27.0 percent water (theoretical). An aliquot of this product was subjected to microscopic examination and a photomicrograph was taken which is shown in FIG. 2 hereof.

EXAMPLE II

A 50 ml aqueous solution of aluminum chlorhydroxide assaying at approximately 6.5 percent aluminum and 4.5 percent chloride was added to the vortex of a 600 ml volume of 2-methyl-1-propanol at a rate of 5 mls per minute through an 18 gauge hypodermic needle. The resulting friable and microspherical aluminum chlorhydroxide solids in 2-methyl-1-propanol were allowed to remain in contact for five minutes, were then collected and dried as in Example I, corresponded to an approximate average particle size of 100 microns in diameter, and assayed at 21.6 percent aluminum, 14.1 percent chloride, and 30.2 percent water (theoretically calculated).

EXAMPLE III

The same procedure was followed as in Example II, except that a 22 gauge hypodermic needle was employed. The product corresponded to an approximate average particle size of 60 microns in diameter and assayed at 22.9 percent aluminum, 14.9 percent chloride, and 26.1 percent water (theoretically calculated).

EXAMPLE IV

The same procedure was followed as in Example II, except that a 25 gauge hypodermic needle was used. The product corresponded to an approximate average particle size of 40 microns in diameter and assayed at 24.1 percent aluminum, 16.6 percent chloride, and 21.7 percent water (theoretically calculated).

EXAMPLE V

The same procedure was followed as in Example IV, except that the rate of aluminum chlorhydroxide addition was 3 mls per minute. The product corresponded to an approximate average particle size of 30 microns in diameter and assayed at 20.8 percent aluminum, 13.8 percent chloride and 32.7 percent water (theoretically calculated).

EXAMPLE VI

The same procedure was used as in Example IV, except that the concentration of aluminum in the solution to be dried was 3.3 percent and the chloride concentration was approximately 2.2 percent. The product corresponded to an approximate average particle size of 20 microns in diameter, 15.9 percent chloride, and 19.6 percent water (theoretically calculated).

EXAMPLE VII

A 50 ml solution of aluminum chlorhydroxide assaying at approximately 6.5 percent aluminum and 4.5 percent chloride was pumped through a 1/16 inch internal diameter neoprene tube and delivered at a rate of 20 mls per minute into the vortex of a mechanically agitated 700 ml volume of 2-methyl-1-propanol via a spray nozzle of 0.016 to 0.018 inch outlet or terminal orifice. The aluminum chlorhydroxide was allowed to remain in contact with the 2-methyl-1-propanol after total addition for an additional five minute period. The microspherical product was recovered from the 2-methyl-1-propanol by filtration and dried in air as in Example I. This dried microspherical product was found to be free from 2-methyl-1-propanol as determined by gas chromotagraphic analysis and corresponded to 60 percent of the microspheres being less than 44 microns in diameter and assayed at 22.4 percent aluminum, 15.3 percent chloride and 27.3 percent water (theoretically calculated).

EXAMPLE VIII

The same procedure was used as in Example VII, except that a 30 ml per minute addition of aqueous aluminum chlorhydroxide was employed and the final dried product corresponded to 40 percent of the microspheres being less than 44 microns in diameter and assayed at 22.0 percent aluminum, 14.9 percent chloride, and 28.7 percent water (theoretically calculated).

EXAMPLE IX

A 50 ml solution of a 5/6 basic aluminum bromide [$Al_2(OH)_5Br$] assaying at approximately 5.3 percent aluminum and 8 percent bromide was treated as in Example VII, and the resulting microspherical product corresponded to 18.7 percent aluminum, 29.0 percent bromide and 23.1 percent water (theoretically calculated), and ranged in particle diameter from approximately 10 microns to 350 microns.

EXAMPLE X

A 50 ml aqueous solution of ⅔ basic aluminum chloride [$Al(OH)_2Cl$] assaying at approximately 5.4 percent aluminum and 7.5 percent chloride was treated as in Example VII, and the resulting microspherical product corresponded to 18.9 percent aluminum, 22.7 percent chloride and ranged in particle diameter from 30 to 200 microns.

EXAMPLE XI

A 50 ml aqueous solution of ¾ basic aluminum chloride [$Al_4(OH)_9Cl_3$] assaying at approximately 5.5 percent aluminum and 5.4 percent chloride was treated as in Example VII and the resulting microspherical product corresponded to 20.4 percent aluminum and 18.6 percent chloride and ranged in particle diameter from 30 to 200 microns.

EXAMPLE XII

A 50 ml aqueous solution of aluminum chlorohydroxide assaying at approximately 6.5 percent aluminum and 4.5 percent chloride was treated according to the procedure given in Example VII except that secondary butyl alcohol was employed as the drying agent. The microspherical product ranged from 10 to 300 microns in diameter and assayed at 22.7 percent aluminum and 14.9 percent chloride.

EXAMPLE XIII

A 20 ml aqueous solution of aluminum chlorhydroxide assaying at approximately 6.4 percent aluminum and 4.4 percent chloride was treated according to the procedure set forth in Example VII, except that 500 mls of 2-pentanol was employed as the drying agent. The microspherical product ranged from 10 to 300 microns in diameter and assayed at 23.3 percent aluminum and 15.3 percent chloride.

EXAMPLE XIV

The same procedure was used as in Example XIII, except that 500 mls of isopentyl alcohol was employed as the drying agent. The microspherical product ranged from 10 to 300 microns in diameter and assayed at 25.0 percent aluminum and 15.7 percent chloride.

EXAMPLE XV

The same procedure was used as in Example XIII, except that 500 mls of 2-methyl-1-butanol was employed as the drying agent. The microspherical product ranged from 10 to 300 microns in diameter and assayed at 24.3 percent aluminum and 16.1 percent chloride.

EXAMPLE XVI

The same procedure was used as in Example XIII, except that 500 mls of 2-methyl-1-butanol was employed as a drying agent. The microspherical product ranged from 10 to 300 microns in diameter and assayed at 23.2 percent aluminum and 15.2 percent chloride.

EXAMPLE XVII

Aluminum chlorhydroxide in microspherical form having a particle size of less than 44 microns in diameter was utilized in the amount of 3.5 percent of an antiperspirant composition. As the oily substance I used isopropyl myristate in the amount of 6.5 percent by weight of the composition and as a propellant I used a mixture composed of Freon-11 (50 percent) and Freon-12 (50 percent), the mixture being utilized in the composition in the amount of 90 percent by weight of the composition.

The slurry of aluminum chlorhydroxide and isopropyl myristate were agitated at slow rates by a Lightnin' Mixer and to this mixture was added the Freon 11/12. The formulation so obtained was subjected to centrifugation at 500 rpm for 2 minutes and then shelf-aged at room temperature for a three month period. Following shelf-aging, only two inversions of the bottle containing this formulation brought on a total and complete resuspension of the microspherical aluminum chlorhydroxide.

EXAMPLE XVIII

Aluminum chlorhydroxide in microspherical form having a particle size of less than 44 microns in diameter was utilized in the amount of 3.5 percent of an antiperspirant composition. As the oily substance, I used isopropyl myristate in the amount of 6.2 percent by weight of the composition and 0.3 percent by weight of the composition of Cab-O-Sil grade M-5 fumed silica (registered trademark of the Cabot Corporation) as a bulking or suspending agent. The propellants used are described in Example XVII.

The slurry of aluminum chlorhydroxide, isopropyl myristate, and Cab-O-Sil was then treated as described in Example XVII. Following centrifugation and shelf-aging, only two inversions of the bottle containing this formulation brought on a total and complete resuspension of the microspherical aluminum chlorhydroxide.

EXAMPLE XIX

Formulations were prepared as set forth in Examples XVII and XVIII except aluminum chlorhydroxide in microspherical form in diameters less than 74 microns were utilized in the amount of 3.5 percent by weight of the antiperspirant composition. The formulations were then treated as in Example XVII and were found to resuspend in a like manner as set forth in Example XVII and XVIII.

EXAMPLE XX

The same procedure was followed as set forth in Example XVII except that the composition was not centrifuged but samples thereof were formulated one of which was shelf-aged at room temperature and another was shelf-aged at 105°, for a period of six months. At the end of this period the compositions were tested by uutilizing them in aerosol bombs. No problem or abnormalities could be observed as to any of the samples so far as resuspension, stability or valve clogging are concerned.

In the foregoing detailed description of my invention I have set forth specific embodiments of the invention, but it is understood that many changes and variations may be made in the compounds, compositions and processes herein set forth and the practice of the invention may take many forms, all within the spirit of the invention and the scope of the appended claims.

I claim:

1. A basic aluminum halide in solid microspherical form in which the solid spherical particles have a diameter of 2 to 500 microns prepared by a process comprising the steps of discharging an aqueous solution of a halide having the formula $Al_n(OH)_xQ_y \cdot XH_2O$ wherein $x + y = 3n$, $x$ is 2 or more, X is 2 to 4 and Q is chlorine or bromine or mixtures thereof, in finely divided form, into the cavity in a whirling vortex of an organic alcohol having 4 or 5 carbon atoms and a branched methyl group, and separaring the resulting aluminum halide microspheres from said alcohol.

2. Basic aluminum halides as set forth in claim 1 wherein the microspheres of said halide have an average diameter of less than 44 microns.

3. Basic aluminum halides as set forth in claim 1 wherein the microspheres of said basic aluminum halide have a diameter of less than 74 microns.

4. Basic aluminum halides as set forth in claim 1 wherein Q is chlorine.

5. Basic aluminum halides as set forth in claim 1 wherein Q is bromine.

6. Basic aluminum halides as set forth in claim 1 wherein the formula for said halides is [Al(OH)$_2$Q] where Q is chlorine or bromine.

7. Basic aluminum halides as set forth in claim 1 wherein the formula for said halides is [Al$_4$(OH)$_9$Q$_3$] where Q is chlorine or bromine.

8. Basic aluminum halides as set forth in claim 1 wherein the formula for said halides is [Al$_2$(OH)$_5$Q] where Q is chlorine or bromine.

9. Basic aluminum halides as set forth in claim 1 wherein the formula for said halides is [Al$_2$(OH)$_5$Cl].

10. In a process for preparing in microspherical form basic aluminum halides having the formula Al$_n$(OH)$_x$Q$_y$.XH$_2$O wherein $x+y=3n$, $x$ is 2 or more, X is from 2 to 4, and Q is chlorine or bromine or mixtures thereof, said halides being solid and in microspherical form having a diameter of from 2 to 500 microns, the step of discharging an aqueous solution of said halides in finely divided form into the cavity of a whirling vortex of an organic alcohol which has from 4 to 5 carbon atoms and a branched methyl group.

11. A process as set forth in claim 10 wherein said alcohol is 2-methyl-1-propanol.

12. A process as set forth in claim 10 which includes the step of separating said halides in microspherical form from said alcohol.

13. A process as set forth in claim 10 wherein said halide is discharged from a nozzle into said cavity.

14. A process as set forth in claim 10 wherein said halide is discharged from a small diameter tube into said cavity.

15. A process as set forth in claim 10 wherein said halide is chloride.

16. A process as set forth in claim 10 wherein said halide is basic aluminum bromide.

17. A process as set forth in claim 10 wherein said halide is basic aluminum chloride and wherein said organic alcohol is 2-methyl-1-propanol.

18. A process as set forth in claim 10 wherein said aqueous halide solution contains about 10 to 50 percent by weight of said basic aluminum halide.

19. A process as set forth in claim 10 wherein said alcohol is contained in a cylindrical container.

20. A process as set forth in claim 10 including the step of impelling said alcohol in a circular movement to maintain said vortex during the discharge of said halide.

* * * * *